United States Patent
Nakamura et al.

(10) Patent No.: US 9,182,286 B2
(45) Date of Patent: Nov. 10, 2015

(54) INFRARED SENSOR AND A CIRCUIT BOARD EQUIPPED THEREWITH

(75) Inventors: Kenzo Nakamura, Naka (JP); Sei Kitaguchi, Saitama (JP); Mototaka Ishikawa, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 370 days.

(21) Appl. No.: 13/393,686

(22) PCT Filed: Oct. 14, 2010

(86) PCT No.: PCT/JP2010/068023
§ 371 (c)(1),
(2), (4) Date: Mar. 1, 2012

(87) PCT Pub. No.: WO2011/046163
PCT Pub. Date: Apr. 21, 2011

(65) Prior Publication Data
US 2012/0269228 A1    Oct. 25, 2012

(30) Foreign Application Priority Data
Oct. 17, 2009  (JP) .................. 2009-239926

(51) Int. Cl.
*G01K 7/00* (2006.01)
*G01K 7/16* (2006.01)
(Continued)

(52) U.S. Cl.
CPC ...... *G01J 5/02* (2013.01); *G01J 1/04* (2013.01); *G01J 1/44* (2013.01); *G01J 5/024* (2013.01);
(Continued)

(58) Field of Classification Search
CPC ............ G01J 1/02; G01J 5/02; G01J 5/10; G01J 5/20; G01J 1/44; G01J 1/16; G01J 5/00; G01K 1/14; G01K 1/16; G01K 7/22; H01C 1/142; H01C 7/04; H01L 37/00; H01L 27/14; H01L 31/09; H01M 10/48; H01M 2/10; H01M 8/02; H01M 4/90; H01M 8/12

USPC .......... 374/130, 163, 185, 120–121, 124, 129; 250/338.1, 338.4, 338.3, 339.09
See application file for complete search history.

(56) References Cited

U.S. PATENT DOCUMENTS 5,013,919 A * 5/1991 Solomon .................. 250/349
5,521,123 A * 5/1996 Komatsu et al. .......... 438/64
(Continued)

FOREIGN PATENT DOCUMENTS

CN    1644467 A    7/2005
JP    02-146338 U  12/1990
(Continued)

OTHER PUBLICATIONS

International Search Report mailed Jan. 18, 2011 for the corresponding PCT Application No. PCT/JP2010/068023.
(Continued)

*Primary Examiner* — Gail Kaplan Verbitsky
(74) *Attorney, Agent, or Firm* — Leason Ellis LLP.

(57) ABSTRACT

An infrared sensor allows for a large temperature difference between a temperature sensor for the detection of infrared rays and a temperature sensor for temperature compensation; a reduction in size; and a low manufacturing cost. The infrared sensor comprises: an electrical insulating film sheet; first temperature sensor and second temperature sensor which are provided on one side of the electrical insulating film sheet, and are located at a distance from each other; first foil conductor patterns formed on one side face of the electrical insulating film sheet, and are connected to the first temperature sensor; second foil conductor patterns formed on the one side of the electrical insulating film sheet, and are connected to the second temperature sensor; and an infrared reflector film provided on the other side of the electrical insulating film sheet, and is opposite the second temperature sensor across the electrical insulating film sheet.

12 Claims, 4 Drawing Sheets

(51) Int. Cl.
*G01J 1/16* (2006.01)
*G01J 1/18* (2006.01)
*G01J 1/42* (2006.01)
*G01J 5/00* (2006.01)
*G01J 5/02* (2006.01)
*G01J 1/04* (2006.01)
*G01J 1/44* (2006.01)
*G01J 5/04* (2006.01)
*G01J 5/08* (2006.01)

(52) U.S. Cl.
CPC .. *G01J 5/04* (2013.01); *G01J 5/046* (2013.01); *G01J 5/08* (2013.01); *G01J 5/0846* (2013.01); *G01J 5/0853* (2013.01)

(56) References Cited

U.S. PATENT DOCUMENTS

| | | | |
|---|---|---|---|
| 5,962,854 A * | 10/1999 | Endo | 250/349 |
| 6,346,703 B1 * | 2/2002 | Lee et al. | 250/338.1 |
| 8,465,201 B2 * | 6/2013 | Imholt | 374/121 |
| 8,523,427 B2 * | 9/2013 | Pillans | 374/129 |
| 8,556,504 B2 * | 10/2013 | Herrmann et al. | 374/178 |
| 8,814,426 B2 * | 8/2014 | Nakamura et al. | 374/121 |
| 2003/0123517 A1 | 7/2003 | Nojiri | |
| 2005/0061878 A1 * | 3/2005 | Barenburg et al. | 235/385 |
| 2007/0059499 A1 | 3/2007 | Yuasa et al. | |

FOREIGN PATENT DOCUMENTS

| | | | |
|---|---|---|---|
| JP | 05-118909 A | | 5/1993 |
| JP | 05118909 A | * | 5/1993 |
| JP | 07-027605 A | | 1/1995 |
| JP | 07027605 A | * | 1/1995 |
| JP | 07-235405 A | | 9/1995 |
| JP | 07-260579 A | | 10/1995 |
| JP | 08-145798 A | | 6/1996 |
| JP | 08-148727 A | | 6/1996 |
| JP | 08148727 A | * | 6/1996 |
| JP | 10-318830 A | | 12/1998 |
| JP | 2000-077207 A | | 3/2000 |
| JP | 2000-097765 A | | 4/2000 |
| JP | 2000-298063 A | | 10/2000 |
| JP | 2000298063 A | * | 10/2000 |
| JP | 2002-156284 A | | 5/2002 |
| JP | 2003-194630 A | | 7/2003 |
| JP | 2003194630 A | * | 7/2003 |
| JP | 2010-281578 A | | 12/2010 |

OTHER PUBLICATIONS

Office Action mailed Mar. 3, 2014 for the corresponding Chinese Application No. 201080037365.1.

Office Action mailed May 30, 2014 for the corresponding Japanese Application No. 2010-170877.

* cited by examiner

INFRARED SENSOR AND A CIRCUIT BOARD EQUIPPED THEREWITH

CROSS-REFERENCE TO RELATED PATENT APPLICATIONS

This application is a U.S. National Phase Application under 35 U.S.C. §371 of International Patent Application No. PCT/JP2010/068023, filed Oct. 14, 2010, and claims the benefit of Japanese Patent Application No. 2009-239926, filed Oct. 17, 2009, all of which are incorporated by reference herein. The International Application was published in Japanese on Apr. 21, 2011 as International Publication No. WO 2011/046163 under PCT Article 21(2).

FIELD OF THE INVENTION

This invention relates to an infrared sensor for measuring the temperature of an object to be measured by detecting infrared rays from the object, and also relates to a circuit board equipped with the infrared sensor.

BACKGROUND OF THE INVENTION

Infrared sensors allow contact less detection of infrared rays radiated and emitted from an object to be measured. Such sensors have been conventionally used as a temperature sensor.

For example, Japanese Unexamined Patent Application Publication JP 2002-156284A (Paragraph [0026], FIG. 2) discloses an infrared sensor comprising:
a resin film placed in a support body;
a temperature sensor device for detection of infrared rays, which is provided in the resin film and detects the infrared rays passing through an optical guide portion; and
a temperature sensor device for temperature compensation, which is provided in the resin film, is shielded from the infrared rays and detects the temperature of the support body.

In this infrared sensor, an infrared absorption film is formed on the interior surface of the guide portion. Also, the resin film contains an infrared absorption material such as carbon black to enhance its infrared absorption.

Further, Japanese Unexamined Patent Application Publication JP H07-260579A (Claims, FIG. 2) discloses an infrared sensor comprising:
a temperature sensor device for detection of infrared rays,
a temperature sensor device for temperature compensation,
a resin film to fix these devices firmly, and
a casing.

The casing has a frame body wherein:
the temperature sensor device for detection of infrared rays is placed at the infrared incident aperture side; and
the temperature sensor device for temperature compensation is placed at the shield portion side which blocks infrared rays.

In this infrared sensor, the resin film contains an infrared absorption material such as carbon black to enhance infrared absorption of the resin film; and the frame body is made from a material having good thermal conductivity to reduce the temperature gradient between the temperature sensor devices for detection of infrared rays and for temperature compensation. Additionally, a radial leaded type thermistor with lead wires directly connected to the thermistor device is employed as both temperature sensor devices for detection of infrared rays and for temperature compensation.

Technical Problem

The following technical problems still remain in the conventional art aforementioned. Both infrared sensors of Patent Citations 1 and 2, employ a structure in which the resin film containing an infrared absorption material, such as carbon black, shields one side of the temperature sensor devices from the infrared rays to make this shielded temperature sensor device act as the temperature sensor device for temperature compensation. Since such a resin film has high thermal conductivity, there is a problem in which it will be difficult for a large temperature difference to arise between the temperature sensor devices for detection of infrared rays and for temperature compensation, Further, the distance between these temperature sensor devices is required to be sufficiently large to create a large temperature difference between them. However, this requirement makes the overall size of such an infrared sensor large; and then there is a problem in which minimization of the size thereof is hardly possible. Additionally, the casing is required to be provided with a structure in which the casing itself shields the temperature sensor device for temperature compensation from the infrared rays. Such a structure raises the cost of the casing.

Further, since the infrared sensor of Patent Citation 2 employs a frame body having good thermal conductivity, it allows heat of the infrared absorption film to radiate, and then this radiation makes the sensitivity of the infrared sensor low. This is a problem, too. Also, since a radial leaded type thermistor with lead wires directly connected to the thermistor device is used for the infrared sensor, the narrow space between the lead wires and the thermistor device conducts heat undesirably.

Additionally, this infrared sensor employs a structure in which its chassis shields one of the temperature sensor devices from the infrared rays. However, a shielding portion of the chassis simply blocks the infrared rays incident thereon, and then it absorbs the thermal energy of infrared rays.

Since this absorption makes the temperature of the shielding portion unstable, there is still a problem where this temperature is unsuitable as a reference.

The inventors have recognized the aforementioned problems well, and the aim of the present invention is to provide an infrared sensor and a circuit board equipped with the infrared sensor wherein:
a large temperature difference can arise between the two temperature sensor devices for detection of infrared rays and for temperature compensation;
minimization of the size thereof is easily possible; and the cost of the structure thereof is low.

SUMMARY OF THE INVENTION

The present invitation is an infrared sensor employing the structure below to resolve the aforementioned problems. That is, the infrared sensor of the present invention is an infrared sensor comprising:
an electrical insulating film sheet;
first and second temperature sensor devices which are provided on one side face of the electrical insulating film sheet, and are located at a distance from each other;
first foil conductor patterns which are formed on the one side face of the electrical insulating film sheet, and are connected to the first temperature sensor device;

second foil conductor patterns which are formed on the one side face of the electrical insulating film sheet, and are connected to the second temperature sensor device; and an infrared reflector film which is provided on the other side face of the electrical insulating film sheet, and is opposite the second temperature sensor device across the electrical insulating film sheet.

This infrared sensor provides the infrared reflector film to the other side face of the electrical insulating film sheet. Also, the infrared reflector film is located opposite the second temperature sensor device across the electrical insulating film sheet. The first temperature sensor device measures a temperature of one portion, where the infrared rays incident thereon are applied and absorbed, in the electrical insulating film sheet. On the other hand, the second temperature sensor device measures a temperature of the other portion, where infrared absorption can be considerably reduced by the infrared reflector film which reflects the infrared rays incident thereon, in the electrical insulating film sheet. Thus, compared with the first temperature sensor device, the influence of the infrared rays can be reduced on the second temperature sensor device located just under the infrared reflector film; and then the second temperature sensor device can acquire the temperature used as a highly reliable reference.

Therefore, such a second temperature sensor device and the electrical insulating film sheet, which is thin and has low thermal conductivity, enable a large temperature difference to arise between the first and second temperature sensor devices.

In other words, even if the electrical insulating film sheet is a low thermal conductivity film which does not contain the infrared absorption material and/or the like, the infrared reflector film can reflect the infrared rays incident on the portion just above the second temperature sensor device; and then absorption of the infrared rays can be blocked at the portion. On the other hand, the portion just above the first temperature sensor device does not reflect the infrared rays. Thus a large temperature difference arises between the first and second temperature sensor devices; and then a temperature of the second temperature sensor device can be used as a highly reliable reference. Further, apart from air, the only medium which controls the conducting of heat between the first and second temperature sensor devices is the electrical insulating film sheet; and its cross-section through which heat can be conducted therebetween, is small. Thus, heat conduction between each temperature sensor device becomes difficult; the thermal interference between them becomes smaller; and thus the detection sensitivity becomes higher.

Since thermal coupling between the first and second temperature sensor devices is weak, they can be placed close to each other, and then the overall size of the infrared sensor becomes possible to be minimized.

Further, the method for blocking the infrared rays is not a shield structure using a frame body or a casing, but is with an infrared reflector film. Such a method allows the cost of production to be decreased.

Additionally, even if the infrared reflector film is formed from an electrical conductor material, the electrical insulating film sheet located between the first and second temperature sensor devices can ensure sufficient isolation between them. Thus, materials with high infrared reflectance can be selected for the infrared reflector film without giving any consideration to their isolation.

As abovementioned, the infrared sensor has the structure wherein:

the electrical insulating film sheet having low thermal conductivity reduces the mutual thermal influence of the first and second temperature sensor devices located thereon; and the temperature sensor devices measure, the temperature of a location just under one portion of the electrical insulating film sheet where the infrared rays are applied, and a temperature of another location just under another portion of the electrical insulating film sheet where the infrared rays are reflected, respectively.

Therefore, a large temperature difference can arise between the first temperature sensor device for detection of infrared rays and the second temperature sensor device for temperature compensation, and then greatly enhancing the sensitivity of the infrared sensor becomes feasible.

A structure, in which an infrared absorption film is formed just above the first temperature sensor device on the electrical insulating film sheet, is also usable for the infrared sensor. In this case, the infrared absorption efficiently increases at the first temperature sensor device, and then a greater temperature difference can arise between the first and second temperature sensor devices.

Furthermore, the infrared sensor of the present invention has a feature wherein the first foil conductor patterns are arranged around the first temperature sensor device, and have a larger area than that of the second foil conductor patterns.

That is, in this infrared sensor, the first foil conductor patterns have a shape spreading toward the first temperature sensor device, and are arranged therearound; and the area of the first foil conductor patterns is larger than that of the second foil conductor patterns. The first foil conductor patterns with such area and shape bring improvement in sampling of heat from the portion of the electrical insulating film sheet where the infrared rays are absorbed. Further, since the heat capacity of the first foil conductor patterns becomes close to that of the infrared reflection film and the second foil conductor patterns combined, an error due to the variation therebetween decreases. Additionally, the area and shape of the first foil conductor patterns are preferably determined so to have the heat capacity almost equal to that of the infrared reflector film and the second foil conductor patterns combined.

Also, the infrared sensor of the present invention has a feature wherein the second foil conductor patterns are arranged around the second temperature sensor device.

That is, in this infrared sensor, the second foil conductor patterns have a shape spreading toward the second temperature sensor device and, are arranged therearound. Thus, the second foil conductor patterns with this shape reflect and/or block the infrared rays incident on the other side (the underside of the sensor) of the electrical insulating film sheet. Therefore, the influence caused by the infrared rays incident on the underside of the sensor can be lessened on the portion of the electrical insulating film sheet where the infrared reflector film is formed.

Further, the infrared sensor of the present invention has features wherein:

the electrical insulating film sheet is formed from a polyimide board;

the first and second foil conductor patterns are formed from copper foil; and the infrared reflector film is formed from copper foil.

In other words, in this infrared sensor, a polyimide board is used for forming the electrical insulating film sheet, and copper foil is used for forming the first and second foil conductor patterns and the infrared reflector film. Thus, double-sided flexible circuit board, which is used widely and is made of inexpensive materials, becomes usable for the infrared sensor; and then minimizing the cost of the infrared sensor becomes feasible.

Furthermore, the infrared sensor of the present invention has features wherein:

the infrared reflector film comprises the copper foil, and a gold plating layer coated on the copper foil.

In other words, the copper foil and the gold plating layer coated on the copper foil, comprise the infrared reflector film. Thus, this gold plating layer functions as an anti-oxidation coat for the copper foil, and also enables the infrared reflectance of the infrared reflector film to increase.

A circuit board of the present invention comprises the infrared sensor of the present invention, and a circuit part formed on the electrical insulating film sheet.

In other words, the circuit board of the present invention is equipped with the aforementioned infrared sensor of the present invention together with circuit parts mounted on the above electrical insulating film sheet. Thus, the infrared sensor and such as a circuit part for controlling it, are integrated onto the one circuit board as one unit. Therefore, minimization of the total size of the infrared sensor and reduction of the production costs, become possible.

Advantageous Effects

The present invention brings about the following effects.

That is, in the infrared sensor and the circuit board equipped therewith related to this invention, the infrared reflector film is provided on the other side face of the electrical insulating film sheet, and is opposite the second temperature sensor device across the electrical insulating film sheet. Thus, in comparison with the first temperature sensor device, the second temperature sensor device located under the infrared reflector film for reducing influence of the infrared rays, can acquire the temperature used as a highly reliable reference. This second temperature sensor device and the electrical insulating film sheet, which is thin and has low thermal conductivity, enable a great temperature difference to arise between the first and second temperature sensor devices. Thereby the infrared sensor having high sensitivity becomes feasible; and the infrared sensor of small size can be produced at a low cost.

BRIEF DESCRIPTION OF THE DRAWINGS

These and other features and advantages of the present invention will become more readily appreciated when considered, in connection with the following detailed description and appended drawings, wherein like designations denote like elements in the various views, and wherein.

EXPLANATION OF REFERENCE

Figure 1:
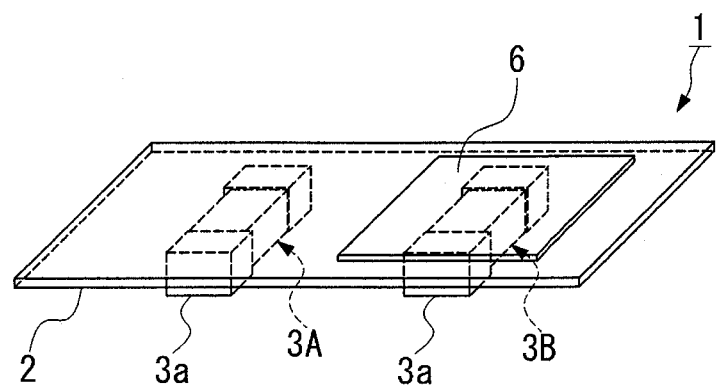
FIG. 1 is a perspective view showing a first embodiment of the infrared sensor regarding this invention.

1, 21 Infrared sensor
2, 32 Electrical insulating film sheet
3A First temperature sensor device
3B Second temperature sensor device
4A, 34A First foil conductor patterns
4B, 24B, 34B Second foil conductor patterns
6 Infrared reflector film
8 Copper foil
9 Gold plate layer
30 Circuit board
35 Circuit part

DETAILED DESCRIPTION OF THE INVENTION

Best Mode of Carrying Out the Invention

Figure 2:
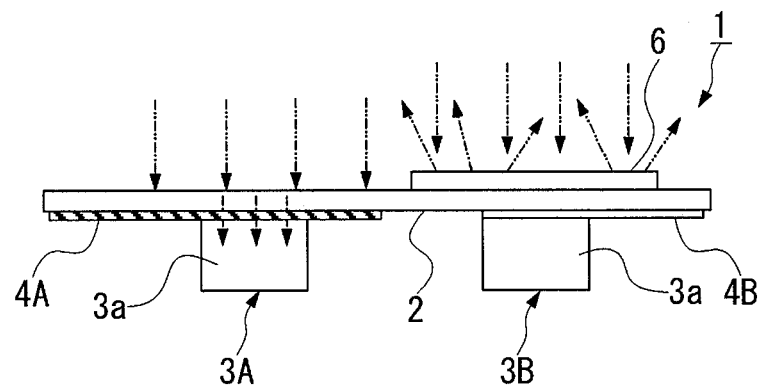
FIG. 2 is a front view showing the infrared sensor, in the first embodiment.

Referring to FIGS. 1 and 2, a first embodiment of the infrared sensor relating to the present invention is detailed in the following descriptions. Further, components shown in the figures used for the following descriptions are individually scaled up or down to various sizes suitable for recognizably showing each of them, or for easily recognizing each of them.

An infrared sensor 1 of the present invention, as shown in FIGS. 1 and 2, comprises:

an electrical insulating film sheet 2;

a first temperature sensor device 3A and a second temperature sensor device 3B which are provided on one side (lower side) face of the electrical insulating film sheet 2, and are located at a distance from each other;

first foil conductor patterns 4A as a pair which are formed on the one side face of the electrical insulating film sheet 2, and are connected to the first temperature sensor device 3A;

second foil conductor patterns 4B as a pair which are connected to the second temperature sensor device 3B, and are formed on the one side face of the electrical insulating film sheet 2; and an infrared reflector film 6 which is provided on the other side face of the electrical insulating film sheet 2, and is opposite the second temperature sensor device 3B across the electrical insulating film sheet 2.

Figure 3:
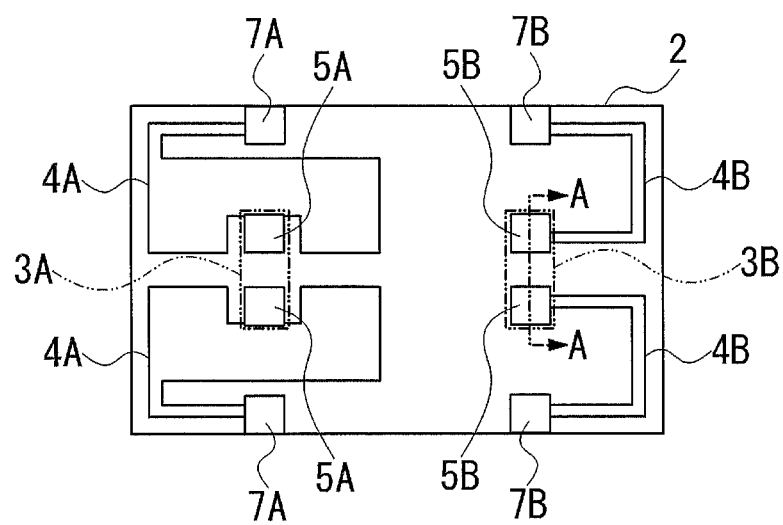
FIG. 3 is a bottom view showing the electrical insulating film sheet on which the temperature sensor device is not yet mounted, in the first embodiment.

The above first foil conductor patterns 4A:

spread toward the first temperature sensor device 3A, are arranged therearound as shown in FIG. 3, and have a larger area than that of the second foil conductor patterns 4B.

The first temperature sensor device 3A is located between the first foil conductor patterns 4A, which are as a pair and form a rectangle having almost the same shape as that of the infrared reflector film 6. In other words, an area and a shape of the first foil conductor patterns 4A are determined so as to make its heat capacity almost equal to that of the infrared reflector film 6 and the second foil conductor patterns 4B combined.

Further, concerning the first foil conductor patterns 4A as a pair, one end of the first foil conductor pattern 4A is connected to first contact electrode 5A formed on the electrical insulating film sheet 2 respectively; and the other end of the first foil conductor pattern 4A is connected to first terminal electrode 7A formed on the electrical insulating film sheet 2 respectively.

Additionally, the second foil conductor patterns 4B as a pair, are formed with a linear shape. Further, one end of the second foil conductor pattern 4B is connected to second contact electrode 5B formed on the electrical insulating film sheet 2 respectively; and the other end of the second foil conductor pattern 4B is connected to second terminal electrode 7B formed on the electrical insulating film sheet 2 respectively.

The first contact electrodes 5A and the second contact electrodes 5B are electrodes to which terminal electrodes 3a of the first temperature sensor device 3A and the second temperature sensor device 3B are bonded respectively with a bonding agent having electrical conductivity, for example solder.

Further, the first terminal electrodes 7A and the second terminal electrodes 7B are electrodes for connecting to an external circuit.

The electrical insulating film sheet 2 is formed from a sheet made of polyimide resin. The infrared reflector film 6, the first foil conductor patterns 4A and the second foil conductor patterns 4B are formed from copper foil. That is, these comprise a double-sided flexible circuit board wherein the infrared reflector film 6 is formed on one side of the polyimide board and, the first foil conductor patterns 4A and the second foil conductor patterns 4B are formed on another side of the polyimide board, which is made of the electrical insulating film sheet 2.

Figure 4:
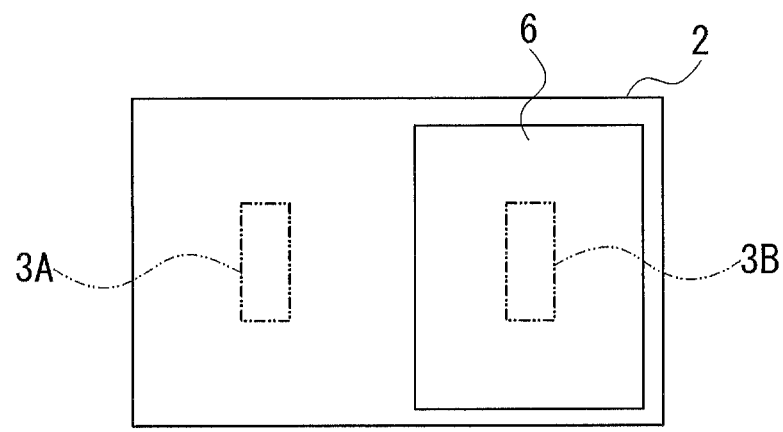
FIG. 4 is a plan view showing the electrical insulating film sheet on which the temperature sensor device is not yet mounted, in the first embodiment.
Figure 5:
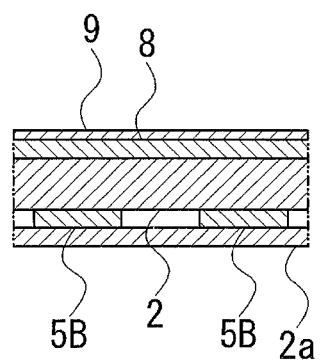
FIG. 5 is a cross-section of the plane shown by the arrow A-A line in FIG. 3.

The infrared reflector film 6 with a quadrilateral shape is located just above the second temperature sensor device 3B, as shown in FIG. 4. Further, as shown in FIG. 5, the infrared reflector film 6 comprises copper foil 8 and a gold plating layer 9 coated on the copper foil 8. Furthermore, coverlay film 2a is formed on the underside of the electrical insulating film sheet 2. The coverlay film 2a covers the entire underside, including the first foil conductor patterns 4A and the second foil conductor patterns 4B, excepting the first terminal electrodes 7A and the second terminal electrodes 7B.

The infrared reflector film 6 is formed from a material which has a higher infrared reflectance than that of the electrical insulating film sheet 2, and comprises the aforementioned copper foil 8 and the gold plating layer 9 coated thereon. Instead of the gold plating layer 9, a plate layer formed from, for example, mirror finished evaporated aluminum film or aluminum foil, is also usable. In order to completely cover the second temperature sensor device 3B with the infrared reflector film 6, the infrared reflector film 6 takes a larger size than that taken by the second temperature sensor device 3B.

The first temperature sensor device 3A and the second temperature sensor device 3B are a chip thermistor with terminal electrodes 3a provided at both ends thereof. There are three thermistor types, NTC type, PCT type, and CTR type. In this embodiment, for example, an NTC type thermistor is employed as the first temperature sensor device 3A and as the second temperature sensor device 3B. This type of thermistor is made from thermistor material group (s) of Mn—Co—Cu, Mn—Co—Fe and/or the like. The first temperature sensor device 3A and the second temperature sensor device 3B are mounted on the electrical insulating film sheet 2 by connecting their terminal electrodes 3a to the first contact electrodes 5A or to the second contact electrodes 5B specifically and respectively.

The infrared sensor 1 of this embodiment provides the infrared reflector film 6 on the other side face of the electrical insulating film sheet 2. The location of the infrared reflector film 6 is opposite the second temperature sensor device 3B across the electrical insulating film sheet 2. The first temperature sensor device 3A measures the temperature of one portion, where the infrared rays incident thereon are applied and absorbed, in the electrical insulating film sheet 2. On the other hand, the second temperature sensor device 3B measures the temperature of the other portion, where the infrared absorption can be considerably reduced by the infrared reflector film 6 which reflects the infrared rays incident thereon, in the electrical insulating film sheet 2. Thus, compared with the first temperature sensor device 3A, the influence of the infrared rays can be reduced on the second temperature sensor device 3B located just under the infrared reflector film 6; and then the temperature acquired by the second temperature sensor device 3B, can be a highly reliable reference. Therefore, the second temperature sensor device 3B and the electrical insulating film sheet 2, which is thin and has low thermal conductivity, allow a large temperature difference to arise between the first temperature sensor device 3A and the second temperature sensor device 3B.

Even if the electrical insulating film sheet 2 is a low thermal conductivity film which does not contain the infrared absorption material and/or the like, the infrared reflector film 6 can reflect the infrared rays incident on the portion just above the second temperature sensor device 3B; and then absorption of the infrared rays can be blocked at the portion.

On the other hand, the portion just above the first temperature sensor device 3A does not reflect the infrared rays. Thus a large temperature difference arises between the first temperature sensor device 3A and the second temperature sensor device 3B; and then the temperature of the second temperature sensor device 3B can be used as a highly reliable reference.

Further, apart from air, the only medium which controls the conducting of heat between the first temperature sensor device 3A and the second temperature sensor device 3B is the electrical insulating film sheet 2; and its cross-section through which heat can be conducted therebetween, is small. Thus, mutual heat conduction therebetween becomes difficult; the thermal interference between them becomes smaller; and then the detection sensitivity becomes higher. Since thermal coupling between the first temperature sensor device 3A and the second temperature sensor device 3B is weak, they can be placed closely to each other; and then the overall size can be minimized. Further, the method for blocking the infrared rays is not a shielding structure using a frame body or a casing, but is an infrared reflector film 6. Such a method allows the cost of production to be decreased.

Additionally, even if the infrared reflector film 6 is formed from a conductor material, the electrical insulating film sheet 2 located between the first temperature sensor device 3A and the second temperature sensor device 3B can ensure sufficient isolation between them. Thus, materials having high infrared reflectance can be selected for the infrared reflector film without giving any consideration to their isolation.

As mentioned above, the infrared sensor 1 has a structure wherein:
    the mutual thermal influence of the first temperature sensor device 3A and the second temperature sensor device 3B is reduced on the electrical insulating film sheet 2 having low thermal conductivity; and on the electrical insulating film sheet 2, these temperature sensor devices measure,
temperature of a location just under one portion where the infrared rays are applied, and
temperature of another location just under another portion where the infrared rays are reflected,
respectively.

Therefore, a large temperature difference can arise between the first temperature sensor device 3A for detection of infrared rays and the second temperature sensor device 3B for temperature compensation, and then greatly enhanced sensitivity of the infrared sensor 1 becomes possible.

Furthermore, the first foil conductor patterns 4A are arranged around the first temperature sensor device 3A, and have a larger area than that of the second foil conductor patterns 4B. The first foil conductor patterns 4A having such area and shape improve sampling of heat from the portion of the electrical insulating film sheet 2 where the infrared rays are absorbed. Further, since the heat capacity of the first foil conductor patterns 4A becomes close to that of the infrared reflection film 6 and the second conductor patterns 4B combined, an error due to the variation therebetween decreases.

Furthermore, the copper foil 8 and the gold plating layer 9 coated on the copper foil 8, comprise the infrared reflector film 6. Thus, this gold plating layer 9 functions as an anti-oxidation coat for the copper foil 8, and also enables the infrared reflectance of the infrared reflector film 6 to increase.

Figure 6:
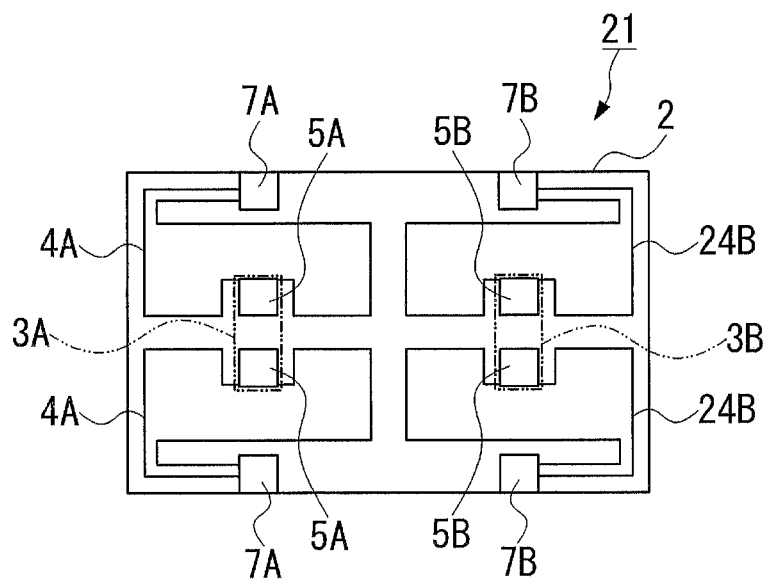
FIG. 6 is a bottom view showing the electrical insulating film sheet on which the temperature sensor device is not yet mounted, in the second embodiment of the infrared sensor regarding this invention.
Figure 7:
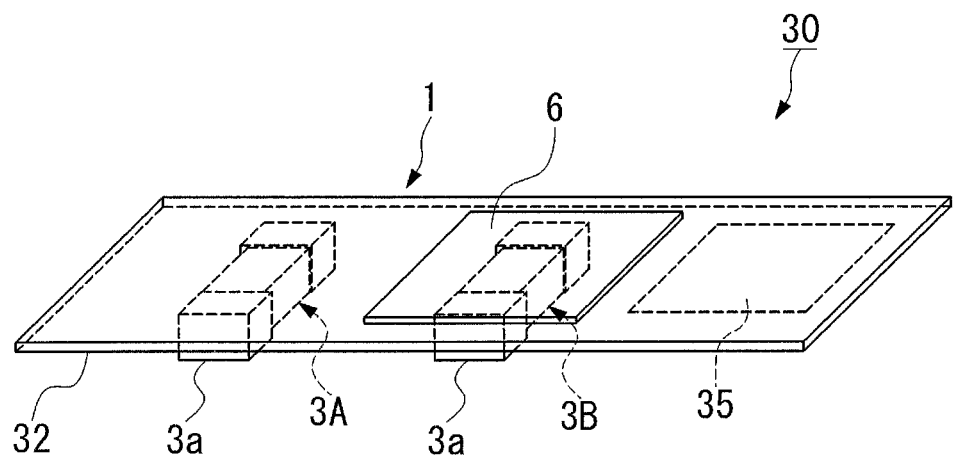
FIG. 7 is a perspective view showing a third embodiment of the infrared sensor and the circuit board equipped with it regarding this invention.
Figure 8:
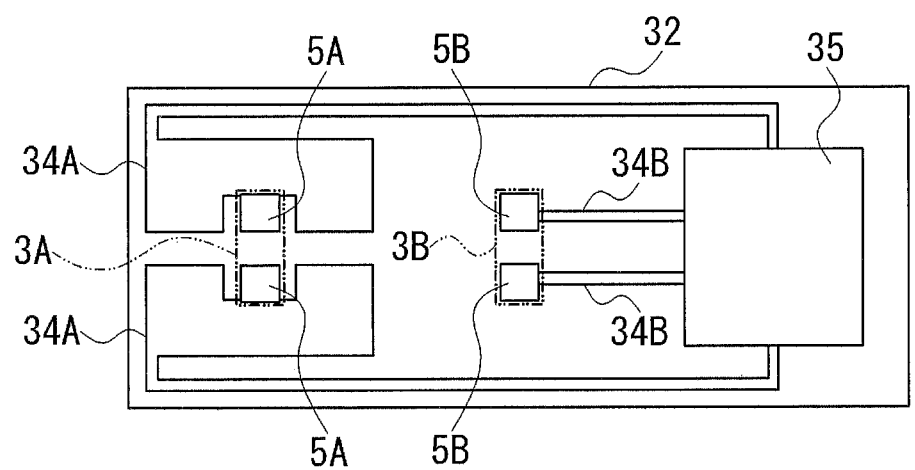
FIG. 8 is a bottom view showing the electrical insulating film sheet on which the temperature sensor device is not yet mounted, in the third embodiment.

Next, second and third embodiments of the infrared sensor relating to the present invention, are detailed in the following descriptions by referring to FIGS. 6 to 8. Further, in the following descriptions, the same components as those of the first embodiment will be denoted by the same reference numerals, and a detailed description thereof will be omitted.

In the first embodiment, the first foil conductor patterns 4A are determined so to have a larger area than that of the second foil conductor patterns 4B. On the other hand, an infrared sensor 21 of the second embodiment has a second foil conductor patterns 24B arranged around a second temperature sensor device 3B. Further the second foil conductor patterns 24B are determined so to have the same area and shape as that of the first foil conductor patterns 4A of the first embodiment. These are points of difference between the first and second embodiments.

The infrared sensor 21 of the second embodiment has the second foil conductor patterns 24B which spread toward the second temperature sensor device 3B and are arranged therearound. Further, the second foil conductor patterns 24B have the effects of reflecting and blocking the infrared rays. Due to these effects, the second foil conductor patterns 24B can reflect and/or block the infrared rays incident on the other side (the underside of the sensor) of the electrical insulating film sheet 2. Thus, the influence caused by the infrared rays incident on the underside of the sensor can be lessened on the portion of the electrical insulating film sheet 2 where the infrared reflector film is formed.

In the first embodiment, the infrared sensor 1 is merely equipped with the first temperature sensor device 3A and the second temperature sensor device 33, which are on the electrical insulating film sheet 2. On the other hand, in the third embodiment, not only the above infrared sensor 1 but also circuit part 35, which is connected to the infrared sensor 1 and is for controlling it, are integrated on the electrical insulating film sheet 32 as one unit. These are points of differences between the first and third embodiments.

In other words, a circuit board 30 of the third embodiment is equipped with the infrared sensor 1 together with the circuit part 35 connected to first and second foil conductor patterns 34A and 34B formed on the electrical insulating film sheet 32.

Thus, the circuit part 35, for example a control circuit, and the infrared sensor 1 are integrated onto the one circuit board as one unit. Therefore, minimizing the total size of the infrared sensor, and reducing the production cost thereof becomes possible.

Additionally, the circuit part 35 provided on the electrical insulating film sheet 32 together with the infrared sensor 1, can be a circuit not only for controlling the infrared sensor 1 but also for other purposes. Further, the circuit board 30 can be a circuit board not only for the infrared sensor but also as a multi-purpose circuit board for various purposes.

In addition, the invention is not limited to the above embodiments, but various modifications can be made without departing from the spirit and scope of the invention.

For example, in the aforementioned embodiments, each first temperature sensor device detects the heat conducted from the electrical insulating film sheet where the infrared rays are directly absorbed. Additionally, a structure with an infrared absorption film formed just above the first temperature sensor device on the electrical insulating film sheet, is usable for the infrared sensor. In this case, the infrared absorption efficiency increases at the first temperature sensor device, and then the temperature difference can arise to a larger extent between the first and second temperature sensor devices. That is, a structure is usable for the infrared sensor, wherein:
the infrared absorption film absorbs infrared rays emitted from an object to be measured;
the temperature of the infrared absorption film is raised by absorbing the infrared rays;
the heat of such heated infrared absorption film, is conducted through the electrical insulating film sheet; and then
the heat conduction causes variation of the temperature of the first temperature sensor device located just below the infrared absorption film.

The infrared absorption film is formed from a material able to absorb infrared rays more efficiently than the non-conductive film can absorb. For example, film containing infrared absorption material such as carbon black, or infrared absorption glass film (borosilicate glass film including silicon dioxide of 71%) are employable as the above material. Additionally, in order to completely cover the first temperature sensor device with the infrared absorption film, the infrared absorption film preferably is larger size than the first temperature sensor device.

In the aforementioned embodiments, a chip thermistor is employed as the first and second temperature sensor devices. Additionally, a thin film thermistor is also employable as the first and/or second temperature sensor devices. Further, a chip thermistor or a thin film thermistor is employed as the temperature sensor devices as aforementioned.

Further, other devices, such as pyroelectric sensor devices, which are non-thermistors, are also employable as the temperature sensor devices.

Furthermore, a structure mentioned below is usable for the infrared sensor. That is, the structure wherein:
a chassis which is firmly fixed to one face of the electrical insulating film sheet and firmly supports the electrical insulating film sheet, is provided;
first and second store portions covered with air and/or foamed plastics having lower thermal conductivity than that of the electrical insulating film sheet, are provided in the chassis; and
the first and second temperature sensor devices are stored in the first and second store portions individually.

INDUSTRIAL APPLICABILITY

The present invention enables a large temperature difference to arise between the two devices for detection of infrared rays and for temperature compensation of an infrared sensor. Further, the present invention can provide an infrared sensor wherein; minimization of the size thereof is easily possible, and the cost of the structure thereof is low.

The invention claimed is:

1. An infrared sensor comprising:
   an electrical insulating film sheet;
   first and second temperature sensor devices which are provided on one side of the electrical insulating film sheet, and are located at a distance from each other;
   first foil conductor patterns which are formed on the one side of the electrical insulating film sheet, and are connected to the first temperature sensor device;
   second foil conductor patterns which are formed on the one side of the electrical insulating film sheet, and are connected to the second temperature sensor device; and
   an infrared reflector film which is provided on another side of the electrical insulating film sheet, and is opposite only the second temperature sensor device across the electrical insulating film sheet, wherein
   a portion of the first foil conductor patterns is arranged around the first temperature sensor device and has a width greater than the rest of the first conductor patterns so that the first foil conductor patterns occupy a larger surface area than a surface area occupied by the second foil conductor patterns.

2. The infrared sensor according to claim 1, wherein:
   the second foil conductor patterns are arranged around the second temperature sensor device.

3. The infrared sensor according to claim 1, wherein:
   the electrical insulating film sheet is formed from a polyimide board;
   the first and second foil conductor patterns are formed from copper foil; and
   the infrared reflector film is formed from copper foil.

4. The infrared sensor according to claim 3 wherein: the infrared reflector film comprises the copper foil, and a gold plating layer coated on the copper foil.

5. A circuit board comprising:
   the infrared sensor according to claim 1, and
   a circuit part formed on the electrical insulating film sheet.

6. The infrared sensor according to claim 2, wherein:
   the electrical insulating film sheet is formed from a polyimide board;
   the first and second foil conductor patterns are formed from copper foil; and
   the infrared reflector film is formed from copper foil.

7. A circuit board comprising:
   the infrared sensor according, to claim 2, and
   a circuit part formed on the electrical insulating film sheet.

8. A circuit board comprising:
   the infrared sensor according to claim 3, and
   a circuit part formed on the electrical insulating film sheet.

9. A circuit board comprising:
   the infrared sensor according to claim 4, and
   a circuit part formed on the electrical insulating film sheet.

10. The infrared sensor according to claim 1, wherein the infrared reflector film is configured to reflect incident infrared rays emitted from an object outside of the infrared sensor.

11. The infrared sensor according to claim 1, wherein the infrared reflector film is configured to abut the insulating film.

12. The infrared sensor according to claim 1, wherein a size and shape of the first foil conductor patterns are such that their heat capacity becomes almost equal to that of the infrared reflector film and the second foil conductor patterns combined.

* * * * *